(12) United States Patent
Kumar et al.

(10) Patent No.: US 10,521,833 B2
(45) Date of Patent: Dec. 31, 2019

(54) METHOD AND SYSTEM FOR DETERMINING LEVEL OF INFLUENCE IN A SOCIAL E-COMMERCE ENVIRONMENT

(71) Applicant: TRANSFORM SR BRANDS LLC, Hoffman Estates, IL (US)

(72) Inventors: Saumitra Kumar, Schaumburg, IL (US); Vinothkumar Narasimhan, Arlington Heights, IL (US); Seyed Alireza Forouzan Ebrahimi, Schaumburg, IL (US); Natalie Eisner, Boca Raton, FL (US); Akash Kapoor, Champaign, IL (US); Malav Hitendrakumar Bhavsar, Mountain View, CA (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 699 days.

(21) Appl. No.: 14/178,348

(22) Filed: Feb. 12, 2014

(65) Prior Publication Data

US 2015/0227987 A1   Aug. 13, 2015

(51) Int. Cl.
| | |
|---|---|
| G06Q 30/00 | (2012.01) |
| G06Q 30/02 | (2012.01) |
| G06Q 50/00 | (2012.01) |
| G05B 19/418 | (2006.01) |

(52) U.S. Cl.
CPC ......... *G06Q 30/0282* (2013.01); *G06Q 50/01* (2013.01)

(58) Field of Classification Search
CPC .......................... G06Q 30/0282; G06Q 50/01
See application file for complete search history.

(56) References Cited

U.S. PATENT DOCUMENTS

| | | | | |
|---|---|---|---|---|
| 6,678,695 | B1* | 1/2004 | Bonneau | G06F 17/30528 |
| 7,761,436 | B2* | 7/2010 | Norton | G06F 17/30997 |
| | | | | 707/705 |
| 2013/0151639 | A1* | 6/2013 | Vastardis | G06Q 30/0241 |
| | | | | 709/206 |
| 2013/0254192 | A1* | 9/2013 | Work | G06Q 10/00 |
| | | | | 707/732 |
| 2014/0222548 | A1* | 8/2014 | Fagalde | G06Q 30/0242 |
| | | | | 705/14.41 |

OTHER PUBLICATIONS

Service Composition for Non-programmers: Prospects, Problems, and Design Recommendations. (Year: 2011).*
http://www.klout.com/ screen shots captured Aug. 7, 2014 (5 pages).

* cited by examiner

*Primary Examiner* — Maria V Vanderhorst
(74) *Attorney, Agent, or Firm* — McAndrews, Held & Malloy, Ltd.

(57) ABSTRACT

A system and method for generating and publishing an indicator or score representative of influence, reliability, and/or trustworthiness of reviews and other forms of commentary is based upon actions of individuals over a communication network such as a social e-commerce environment.

42 Claims, 7 Drawing Sheets

METHOD AND SYSTEM FOR DETERMINING LEVEL OF INFLUENCE IN A SOCIAL E-COMMERCE ENVIRONMENT

FIELD OF THE INVENTION

Certain embodiments of the present invention relate to systems and methods for providing reviews of products and services. More specifically, certain aspects of the present invention relate to systems and methods for generating and publishing an indicator or score representative of influence, reliability, and/or trustworthiness of reviews and other forms of commentary that is based upon actions of individuals in a social e-commerce environment.

BACKGROUND OF THE INVENTION

Individuals shopping for products or services on e-commerce web sites and in traditional "brick-and-mortar" business locations frequently seek user comments and product/service reviews from various sources as part of making a purchase decision. Some sources of reviews of products and services are recognized by shoppers as reliable and trustworthy, such as those produced by consumer product testing organizations. In the rapidly growing e-commerce environment in which many shoppers find themselves, the names of any individuals posting reviews are likely to be unknown to a shopper, and little or nothing is known about the reliability and veracity of the opinions posted.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for generating and displaying an indicator representative of influence of one of a plurality of members of a communication network upon the actions of other members of the communication network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
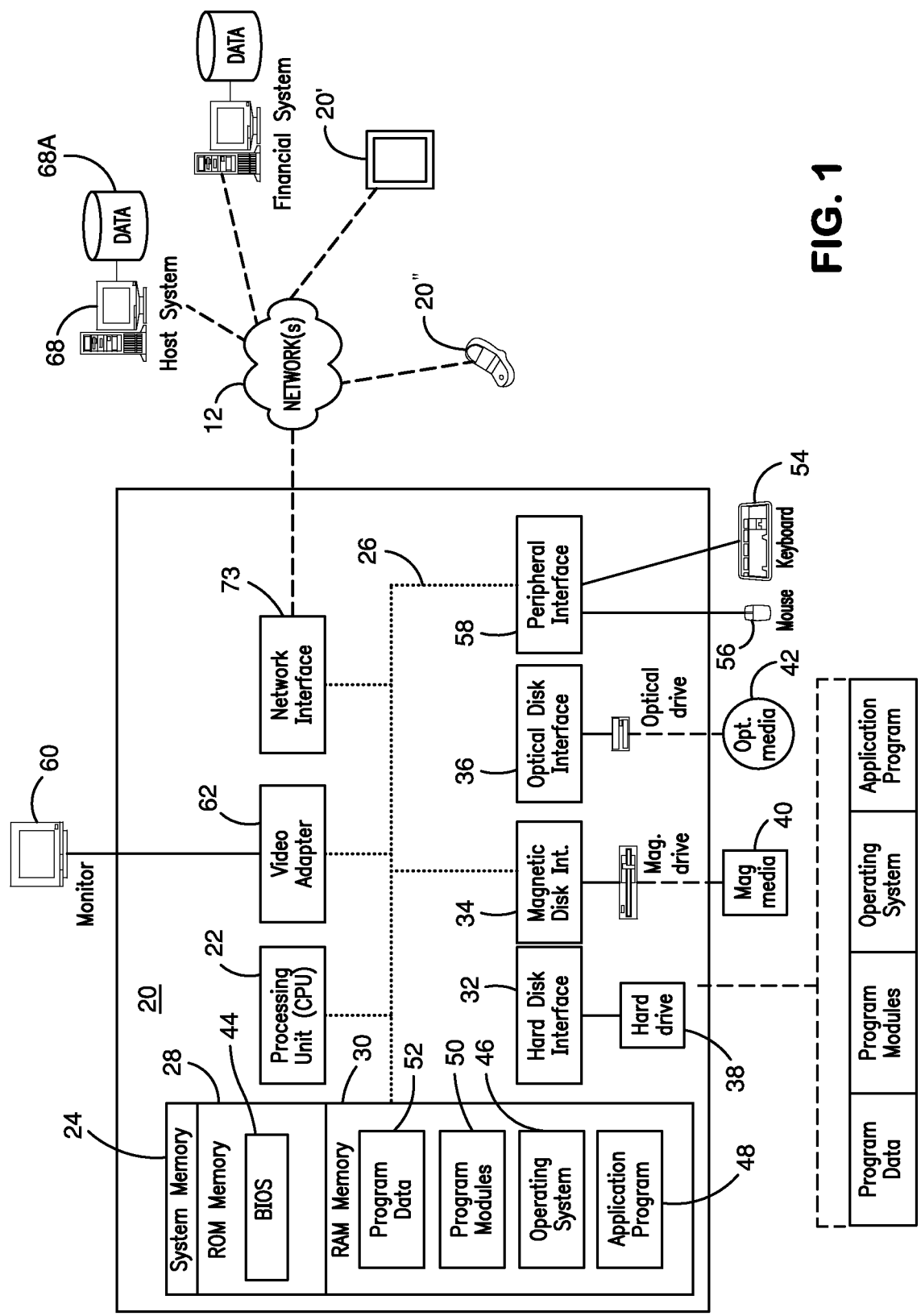
FIG. 1 is an illustration of exemplary computer network in which a representative embodiment of the present invention may be practiced.

Aspects of the present invention relate to systems and methods for providing reviews of products and services. More specifically, certain aspects of the present invention relate to systems and methods for generating and publishing an indicator or score representative of influence, reliability, and/or trustworthiness of reviews and other forms of commentary that is based upon actions of individuals in a social e-commerce environment.

The following description of example methods and apparatus is not intended to limit the scope of the description to the precise form or forms detailed herein. Instead the following description is intended to be illustrative so that others may follow its teachings.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc. The terms "customer," "consumer," and "user" may be used herein interchangeably to refer to a potential or existing purchaser of products and/or services of a business.

The term "loyalty program" may be used herein to refer to a structured marketing effort that rewards, and therefore encourages, loyal buying behavior that is potentially beneficial to the business or firm operating or sponsoring the loyalty program. The term "member" may be used herein to refer to those consumers that have provided personal information to an operator or sponsor of a loyalty program in order to gain access to benefits provided by the loyalty program. The term "personal shopper" may be used herein to refer to an individual that is a member of a merchant loyalty program, that may be highly knowledgeable about various products and services of the merchant, and that has been selected by a merchant to act as a non-employee source of product information and recommendations to other members of the loyalty program.

The term "social network" may be used herein to refer to a network of family, friends, colleagues, and other personal contacts, or to an online community of such individuals who use a website or other technologies to communicate with each other, share information, resources, etc. The term "social graph" may be used herein to refer to a representation of the personal relationships or connections between individuals in a population.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

The term "follow" may be used herein to refer to a user request to be kept informed about a particular person, place, or thing. The term "share" may be used herein to refer to a user request to communicate information about what is being viewed by a user to members of the user's family, friends, or social network.

The term "like" and the phrase "like it" may be used interchangeably herein to refer to a user request to indicate or express a positive feeling or approval in regard to a person, place, or thing. The term "want" and the phrase "want it" may be used interchangeably herein to refer to a user request to express a desire by the user to own are particular thing. The term "have" and the phrases "have it" and "own it" may be used interchangeably herein to refer to a user request to indicate that the user owns or possesses a particular thing.

The term "catalog" may be used herein to refer to a collection of information about things. In some representative embodiments of the present invention, a user may, for example, create their own catalog by, for example, selecting/clicking-on a "Create catalog" button on a web page, and may add a particular product to their "catalog" by, for example, selecting/clicking-on an "Add to catalog" button on a web page for the particular product.

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of exemplary computer network 100 in which a representative embodiment of the present invention may be practiced. The following discloses various example systems and methods for, by way of example and not limitation, generating and publishing an indicator or score representative of influence, reliability, and/or trustworthiness of reviews and other forms of commentary that is based upon actions of individuals in a social e-commerce environment. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social e-commerce networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; receiving a location of a customer via a mobile device; and maintaining maps and layouts of buildings and geographic areas. The host system 68 may also include executable instructions for, among other things, calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; and providing a service call infrastructure for providing the requestor with a distributed customer service experience. The host system 68, alone or in combination with or other elements of FIG. 1, may include executable instructions for, among other things, generating and publishing an indicator or score representative of influence, reliability, and/or trustworthiness of reviews and other forms of commentary that is based upon actions of individuals in a social e-commerce environment.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present invention may be seen in a system or method for generating and displaying an indicator representative of influence of one of a plurality of members of a communication network upon the actions of other members of the communication network, as further described below.

In a representative embodiment of the present invention, software running on elements of a communications network platform such as, for example, the computer network 100 and host system 68 of FIG. 1, may assign a level of influence value or score, which may also be referred to herein as a "ScoreIN" value or score, to each user of the communication network platform, based on the influence of the user upon the actions and/or engagement of other users of the communications network platform. Such a level of influence may be used to, by way of example and not limitation, identify individuals that have the largest overall influence over other individuals using the communications network, and may aid in driving engagement of users with the platform. The assignment and publication of such a level of influence of a user such as, for example, in association with submissions of the user, and on web pages showing lists of leaders or ranking based on the level of influence assigned to each user, may encourage gamification between users attempting to increase their own level of influence or score, and may provide individuals with a sense of pride in their achievement. Merchants and businesses may use the levels of influence assigned to users of the platform to identify particularly influential users, through the use of application program interfaces (API) that may enable systems external to the communications network platform to access information about each user and their associated level of influence value or score. Individuals wishing to improve their influence upon others such as, by way of example and not limitation, celebrities, politicians, and other public figures, may use information about their level of influence to adjust their personal activities to improve their level of influence value or score. Users of a communication network platform such as, for example, members of a social e-commerce network, may use such level of influence information of reviewers of, by way of example and not limitation, various products, services, publications, forms of entertainment, and other items of interest, to determine a level sense of confidence in, trust about, or reliability of the reviews published by the reviewers.

A representative embodiment of the present invention may enable members of a communication network such as a social e-commerce network to better understand their position, reputation, or standing in a community of members, which may be publicized through various visual media including, for example, "leaderboards," showing members ranked in order of level of influence in the communication network. Members may challenge their friend members in a competition to see which of the members can achieve the highest level of influence, driving actions that may result in increased sharing of information, increased engagement of members in the communication network, and in social e-commerce environment, the ability for merchants to recognize the most influential product and/or brand advocates and supporters.

In a representative embodiment of the present invention, a level of influence for an individual may be generated using a number of factors including, for example, information gathered regarding certain activities of members/users of a communication network. Such activities may be selected based on the influence that those activities when performed by one member/user have on the actions of a particular other member/user of the communication network. Such activities may include, by way of example and not limitation, the number of requests by members to "follow" a particular member along with the level of influence of those members that make such a request, the number of requests by members to "follow" a "catalog" created by a particular member, and the number of members indicating that they approve of or "Like" a "catalog" of a particular member. Such activities may also include, by way of example and not limitation, the number of recommendations by a particular member that are considered by other members to be helpful, and the number of times a particular member responds to polls from other members.

A representative embodiment of the present invention may, for example, employ various types of factors in determining a level of influence value or score. The types of factors used in some representative embodiments of the present invention may fall in areas such as, for example, factors that relate to engagement of the members/users of the communication network, factors that relate to social and influential activities of the members/users of the communication network, and other factors that adjust for user/member inactivity or passage of time, which may be referred to herein as "IN" factors.

In a representative embodiment of the present invention, factors that relate to engagement account for aspects of engagement of the member/user with the communication network platform. These factors may be given lower weight in the computation of the level of influence score or value in some representative embodiments of the present invention, because some representative embodiments may desirably measure the influence of a user/member on the other members/users of the communication network platform, rather than on the engagement of the member/user with the platform. Some examples of activities related to engagement include, by way of example and not limitation, creation of a catalog by a member/user, reporting of member/user interest in something or someone, tagging of something or someone by the member/user, and the addition of things to a catalog of the member/user.

In accordance with various representative embodiment of the present invention, examples of social and influential activities of the members/users of the communication network include, by way of example and not limitation, the creation by a member/user of reviews and the occurrence of positive or "helpful" ratings of such reviews by other member/users with their personal levels of influence; the submission of recommendations and the subsequent actions by other member/users and their personal levels of influence, and the number of and/or levels of influence of members/users who choose to follow a particular member/user. Additional examples of social and influential activities of the members/users of the communication network include, by way of example and not limitation, the number of and/or levels of influence of members/users that express approval (e.g., "Like") or request to "follow" a catalog of a member/user. Further examples of social and influential activities of the members/users of the communication network include, by way of example and not limitation, the number of and/or levels of influence of members/users that choose to share a submission (e.g., a review, a comment, a "make") of a member/user and/or of those members/users with whom the submission is shared; and the number of and/or levels of influence of members/users that post a rating of a submission. In a representative embodiment of the present invention, the weight given activities of this type of factor may be variable and may depend on the level of influence value or score of the friends or members/users involved in the activity other than the user/member for whom a level of influence (e.g., "ScoreIN" score or value) is being computed. In addition, the contribution of an activity to the level of influence of a member/user may be adjusted upward (e.g., by a particular factor>1), if the member/user that takes a particular action (e.g., indicates approval ("Likes")) is a member/user that has requested to "follow" the member/user.

The third type of factor that may be employed in some representative embodiments of the present invention include factors that may adjust for user/member inactivity or passage of time such as, by way of example and not limitation, a time decay or an activity decay. These may be used in some representative embodiments to help prevent members/users from "rigging the system," in order to unfairly increase their level of influence scores or values. In a representative embodiment of the present invention, the level of influence of a member/user may be reduced or depleted if the member user does not engage in activities of the communication network platform for a certain period of time (e.g., for a certain number of days, such as 7). In some embodiments, the level of influence value may, for example, be reduced exponentially, and the rate of reduction or depletion of the level of influence of the member/user may be expressed in terms of a "half-life" such as, for example, 90 days. For example, if a member/user fails to engage in activities on the communication network platform for, say, 90 days, the level of influence value or score of the member/user may be reduced to one-half of its original value. In a similar manner, further inactivity of a member/user may reduce the level of influence value or score by 75% of its original value. Such a time decay may be expressed as:

Time decay score=initial score(−2(days of inactivity/time decay half-life))

In a representative embodiment of the present invention, the level of influence value or score of a member/user may also decay due to the type(s) of activities that the member/user chooses to engage in. For example, the contribution to the level of influence (e.g., the "weight") of an activity may be reduced, if the member/user repeats the same type of activity again and again. In this way, a representative embodiment of the present invention may slow down rewarding homogenous activities of a member/user to promote the level of influence of members/users that fully use the different features of the communication network platform. For example, if a member/user expresses approval of a catalog (e.g., the user "Likes" the catalog), and later expresses approval (i.e., "Likes") some other catalog, and keeps "Liking" yet other catalogs, the contribution to the level of influence value or score of the member/user for each successive repetition of that type of activity may be reduced.

In some representative embodiments of the present invention, a formula of the following form may be used to calculate a level of influence score or value:

$$ScoreIn = \sum_{i=0}^{n} factorWeighti * scorei$$

An alternate formula may be used which provides weighting of each of the types of factors used in computing the level of influence or "ScoreIN" value or score. In such an embodiment, the level of influence score or value may be expressed as a sum of a network score, an interaction score, and decay factors, as follows:

ScoreIN=k1*Network Score+k2*Interaction Score−k3*Decay Score where k1, k2, and k3 may be constants that determine how each contributing factor is weighted to calculate the final level of influence or "ScoreIN" value or score. The values of k1, k2, and k3 may be set based upon the desired behavior of a particular embodiment of the present invention. In one representative embodiment of the present invention, the value of k1 may, for example, be in the range of from 100 to 50, the value of k2 may, for example, be in the range of 30 to 20, and the value of k3 may, for example, be in the range of 10 to 0. The calculation of the "Network Score" may be performed as follows:

Network Score=Σ(a follower's ScoreIn−the follower's Network Score)

A "Network Score" of a member/user may be used to measure how influential a member's/user's followers are. As more influential people (i.e., those with a higher level of influence score or value) follow a member/user, the level of influence score or value of the member/user rises.

A member's "Interaction Score" may be computed as the sum of their scores from every qualified influential interaction. In some representative embodiments of the present invention, the "Interaction Score" may be calculated as a linear weighted sum of interactions. The weights assigned to each interaction may be used to determine the impact of each interaction on the final level of influence score or value. The "Interaction Score" shown above may be a measure of, for example, the factors that relate to social and influential activities of the members/users of the communication network, described previously.

The "Decay Score" shown above may correspond to, for example, the "other factors" described previously, which may be used to adjust for user/member inactivity or passage of time, and which may be referred to herein as "IN" factors. The "Decay Score" may be computed as follows:

Decay Score=weight of action*(2((frequency of action/activity decay half-life)−1)/(1−(2(1/activity decay half-life))))

In one representative embodiment of the present invention, the value of the "weight of action" or "weight" may, for example, be in the range of 5 to 60.

The following table illustrates example interactions, which may also be referred to herein as "actions," corresponding example weights:

| Interaction | Weight |
| --- | --- |
| Followers | 60 |
| Followed by | 20 |
| User catalogs | 20 |
| Follow a catalog | 10 |
| Interest | 10 |
| Tag | 10 |
| Catalog likes | 30 |
| Catalogs followers | 50 |
| Add product media | 10 |
| Add a product to a catalog | 5 |
| Create a catalog | 5 |
| Comment on a story | 10 |

-continued

| Interaction | Weight |
| --- | --- |
| Create a poll | 10 |
| Earn a badge | 50 |
| Follow | 5 |
| Invite your friend | 20 |
| Imported existing product | 10 |
| Like a story | 20 |
| First time on mobile | 10 |
| Post a story | 20 |
| Profile updated | 5 |
| Rate a product | 35 |
| Recommend a product | 50 |
| Review a product | 50 |
| Share a product | 35 |
| Share a story | 20 |
| Shop in | 30 |
| Voted topical | 20 |
| Voted poll | 35 |
| Share | 5 |

As a first example, a first member that "follows" 150 other members/users, has submitted 18 reviews, has received 40 "Helpful" review ratings and 3 "Not helpful" review ratings, is "followed" by 200 members/users that have a high level of influence score/value (e.g., in the range of 10,000 to 40,000), has created 20 catalogs that have 300 "likes" and 150 "followers" may, in accordance with one representative embodiment of the present invention, be assigned a level of influence score or value ("e.g., "ScoreIN") of 50,600. In a contrasting second example, a second member that "follows" 409 members/users, has received only 4 "Helpful" review ratings and 13 "Not helpful" review ratings, is "followed" by 150 members/users of which only 4 have a high level of influence value (e.g., in the range of 10,000 to 40,000), and has created 40 catalogs that have 100 "likes" and 50 "followers" may, in accordance with the same representative embodiment of the present invention, be assigned a level of influence score or value of (e.g., "ScoreIN") of 27,680.

Figure 2:
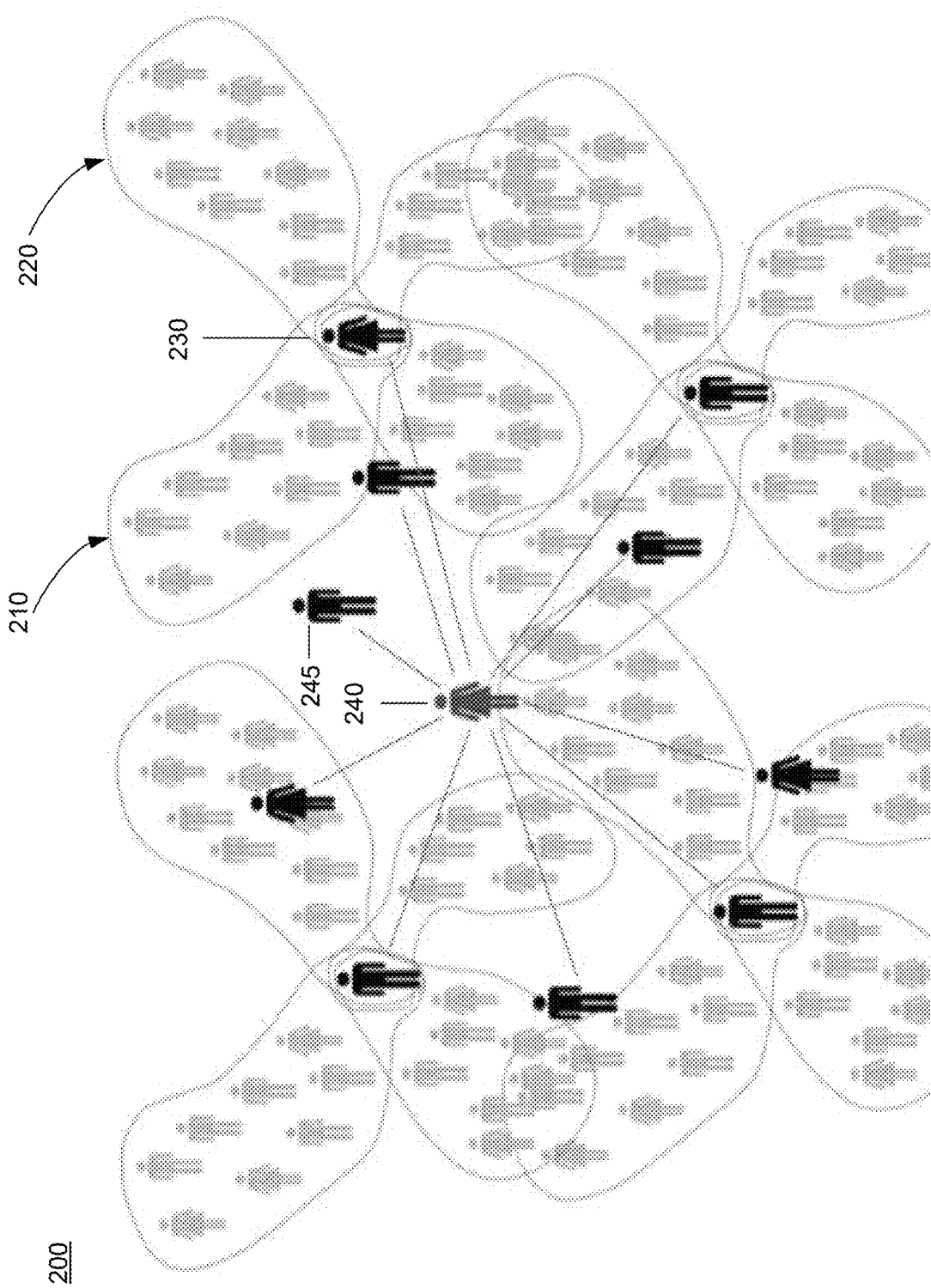
FIG. 2 illustrates an example population of members/users of a communication network that may correspond to, for example, a social e-commerce network such as may be supported by a communication network platform such as the computer network of FIG. 1, in accordance with a representative embodiment of the present invention.

FIG. 2 illustrates an example population of members/users 200 of a communication network that may correspond to, for example, a social e-commerce network such as may be supported by a communication network platform such as the computer network 100 of FIG. 1, in accordance with a representative embodiment of the present invention. The illustration of FIG. 2 shows a number of subgroups of the members/users of the communication network including, for example, two subgroups 210, 220 that may represent personal social networks having members/users that may be influenced by (e.g., that may "follow") a member/user 230, an individual member/user 245 that belongs to no personal social network but may nonetheless be influenced, and a highly influential member/user having influence over the actions of (e.g. being "followed" by) a number of the members/users of the population of members/users 200 communicating and interacting via the communication network platform. In a representative embodiment of the present invention, the level of influence score or value assigned to member/user 240 may be higher than that of member/user 230, which may be higher than that of member/user 245, based on the probable number of actions and the level of influence of the members/users that each member/user has influence over.

Figure 3:
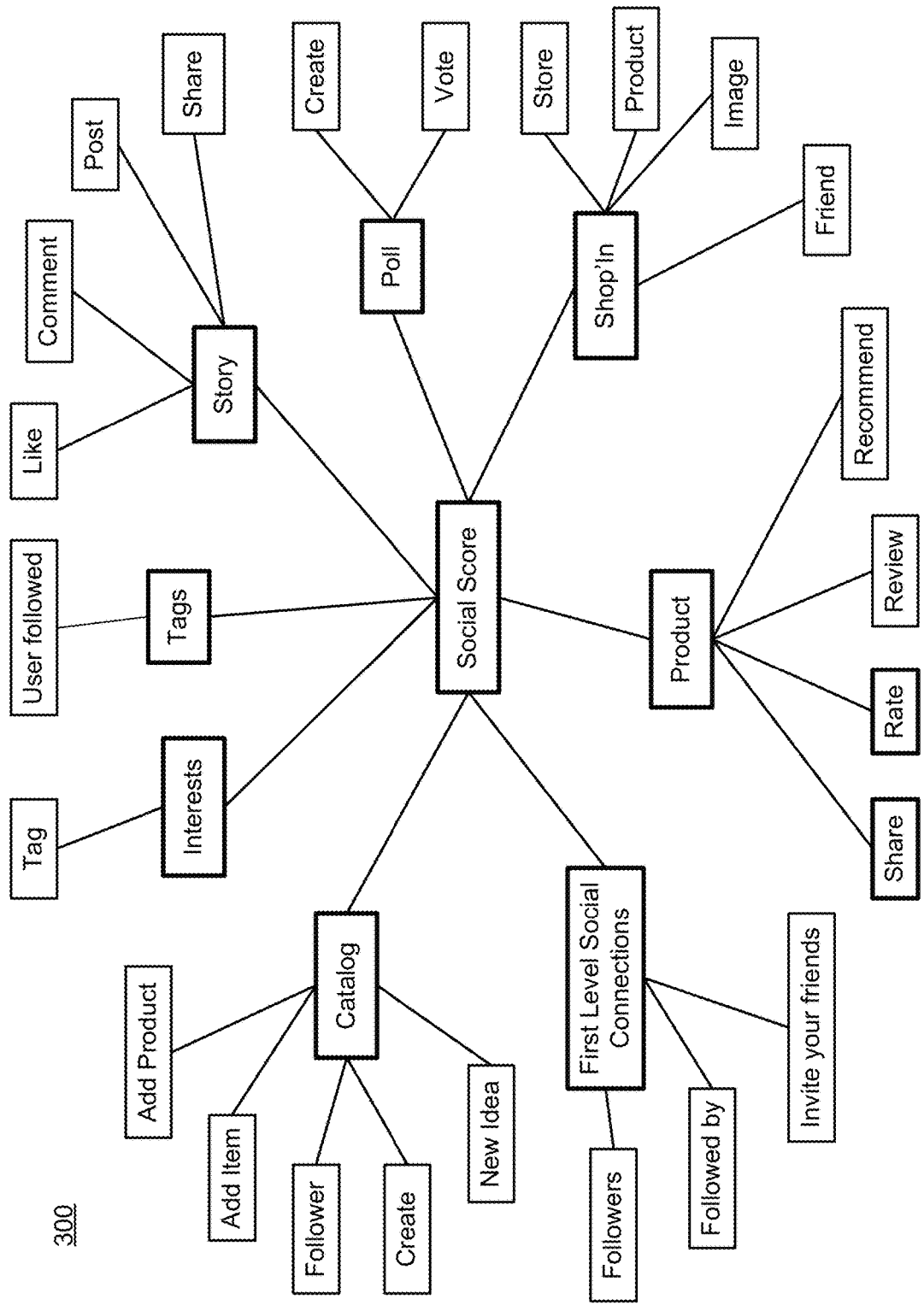
FIG. 3 is an illustration of various forms of interactions that contribute to a member's/user's level of influence score or value (e.g., "ScoreIN"), shown in FIG. 3 as a "social score," in accordance with a representative embodiment of the present invention.

FIG. 3 is an illustration of various forms of interactions that contribute to a member's/user's level of influence score or value (e.g., "ScoreIN"), shown in FIG. 3 as a "social score," in accordance with a representative embodiment of the present invention. The illustration of FIG. 3 includes, at the extremes, various possible actions of members/users of a communication network, and in particular a social e-commerce network. Such interactions may involve member/user actions such as, by way of example and not limitation, creating or adding a product to a catalog; being "followed by" or "following" another member/user; and reviewing, rating, or recommending a product. In addition, such interactions may involve actions such as, for example, creating a poll for other members/users; and "liking," commenting on, or sharing a story of another member/user. The member/user may take such actions with respect to, by way of example and not limitation, products, services, and submissions of other member/users of a communication network such as, for example, a social e-commerce network such as that supported by the computer network 100 of FIG. 1. Further discussion of the significance of the elements of FIG. 3 may be found below with respect to FIGS. 4-7.

Figure 4:
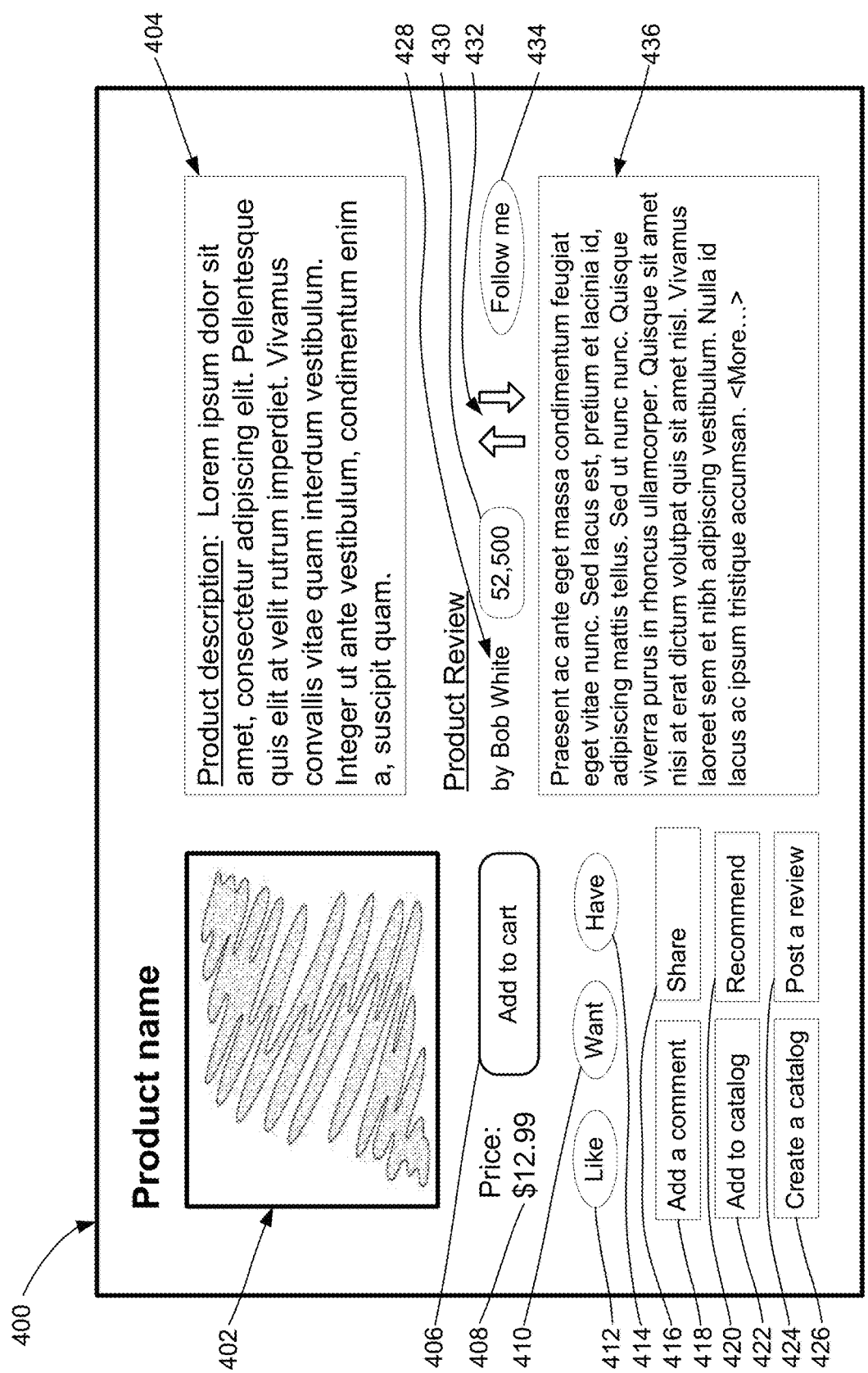
FIG. 4 is an illustration of an example product screen showing a level of influence associated with a contributor, "Bob White," of a review of the listed product, in accordance with a representative embodiment of the present invention.

FIG. 4 is an illustration of an example product screen 400 showing a level of influence 430 associated with a contributor, "Bob White", 428 of a review 436 of the listed product, in accordance with a representative embodiment of the present invention. The product screen 400 may appear as part of a web page displayable on any suitable device described above with respect to the computer network of FIG. 1 including, by way of example and not limitation, a smart phone, a cell phone, a tablet computer, a media player, an e-reader, and a laptop, desktop, net book, or other form of personal computer (PC). The example product screen 400 of FIG. 4 includes a product image 402, an associated product price 408, and a product description 404. The viewer may choose to purchase the product pictured in product image 402 from this page, using an "Add to cart" button 406. In some representative embodiments, such an action by the viewer, in association with the display of the review 436 by contributor 428 (i.e., "Bob White") may, for example, be a factor incorporated into the computation of the level of influence 430 for the contributor 428 of the review 436, due to the possible influence of the review 436 submitted by contributor 428 upon the purchaser. For example, in accordance with a representative embodiment of the present invention, the determination of a correlation between the appearance of a review by a particular review contributor and a subsequent purchase of the product by others when the product is displayed in association with the review of the particular reviewer, may be embodied in the computation of level of influence so as to result in an increase in the computed level of influence for the contributor of the product review.

As shown in FIG. 4, the viewer of product screen 400, who may be a member of a loyalty program of a merchant responsible for producing, delivering, or sponsoring the product screen 400, may choose to indicate a feeling about or interest in the illustrated product through the use of the "Like" 412, "Want" 410, and "Have" 414 icons. In a representative embodiment of the present invention, the act of selecting/clicking-on any of the "Like" 412, "Want" 410, and "Have" 414 icons may be used in computing a level of influence of a member of a social e-commerce network of which the viewer is also a member, depending upon where and how these user interface elements appear. For example, although the "Like" 412, "Want" 410, and "Have" 414 icons appear in FIG. 4 in association with the product illustrated in product image 402, a "Like" button (not shown in the example of FIG. 4) may also be logically or physically associated with a review of the listed product, such as the review 436 shown in FIG. 4, permitting the viewer to take an action to indicate their feeling about the review 436 submitted by contributor 428 (i.e., "Bob White") rather than the product described in product description 404 and pictured in product image 402. The example product screen 400 also shows up and down arrows 432, which may be used by the viewer to indicate a positive (i.e., approval) or negative (i.e., disapproval) feeling or opinion, respectively, with regard to the review 436. The act of expressing such feelings may also be used in computing a level of influence, such as the level of influence 430 located in physical proximity to the information identifying the contributor 428 of the review 436. The viewer may also request that the viewer be kept informed about the activities, submissions, contributions, postings, comments, and the like, of the contributor 428, by selecting/clicking-on the "Follow-me" user interface element 434. In a representative embodiment of the present invention, such a user action may be a factor in the computation of a level of influence of a contributor of a submission such as, for example, the contributor 428 (i.e., "Bob White") that submitted the review 436.

In addition, the product screen 400 of FIG. 4 enables a viewer to take other actions such as, for example, to submit a comment related to the product pictured in FIG. 4, or the review 436, by selecting/clicking-on an "Add a comment" button 418, and to share information about the illustrated product with, by way of example and not limitation, other members, friends, and/or family, by selecting/clicking-on a "Share" button 416. The viewer may choose to add the illustrated product of FIG. 4 to a catalog or collection of various things (e.g., products, services, "makes," and/or media content), by selecting/clicking-on an "Add to catalog" button 422, to create a new catalog by selecting/clicking-on a "Create a catalog" button 426, or to submit a recommendation of the listed product of FIG. 4, by selecting/clicking-on a "Recommend" button 420. The viewer may also choose to submit their own review of the product shown in the product image 402, by selecting/clicking-on a "Post a review" button 424. In a representative embodiment of the present invention, any users actions, such as those described above as non-limiting examples, may be used in the computation of a level of influence of a member of a communication network such as, for example, a social e-commerce network, depending upon the affect that such actions have upon the actions of other members of the communication network.

Figure 5:
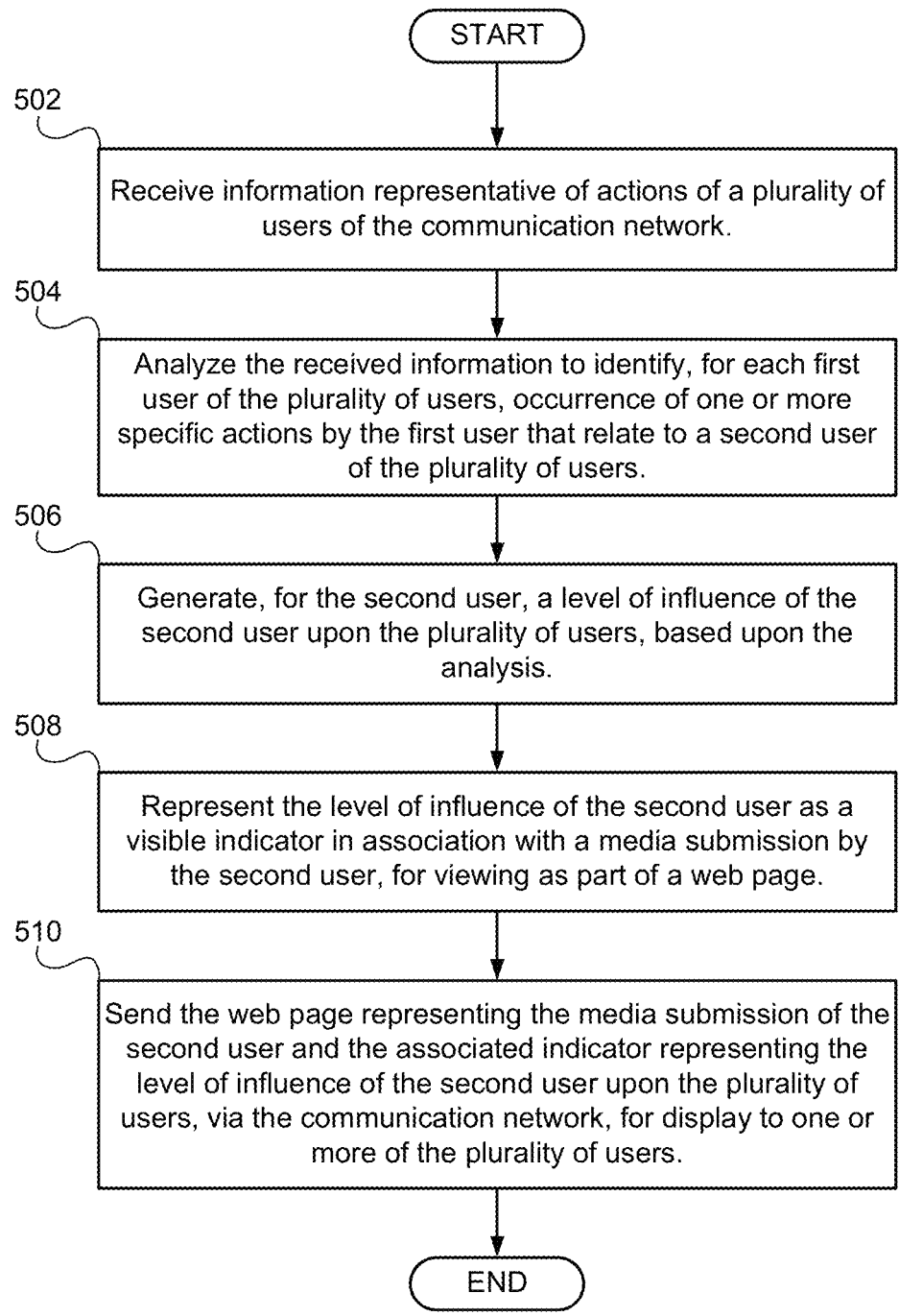
FIG. 5 is a flowchart illustrating an exemplary method that supports displaying an indicator representative of influence of one of a plurality of users of a communication network upon the actions of other users of the plurality of users, in accordance with a representative embodiment of the present invention.

FIG. 5 is a flowchart illustrating an exemplary method that supports displaying an indicator representative of influence of one of a plurality of users of a communication network upon the actions of other users of the plurality of users, in accordance with a representative embodiment of the present invention. The following discussion of the various actions described in FIG. 5 may make reference to various elements of the system described above with respect to FIG. 1 that may be used to perform the actions described below.

The method of FIG. 5 begins at block 502, where a system performing the method, for example the host system 68 of FIG. 1, may receive information representative of actions of a plurality of users of the communication network. In a representative embodiment of the present invention, the communication network may be, for example, a social e-commerce network supporting communication and shopping activities of users that are members of a loyalty program of a retail merchant, and the actions may be, by way of example and not limitation, actions that one member takes that have influence upon the actions of other members of the social e-commerce network, such as those described above with respect to FIG. 3 and FIG. 4.

Next, at block 504, the method may direct the system to analyze the received information. The analysis may comprise identifying, for each first user of the plurality of users, occurrence of one or more specific actions by the first user that relate to a second user of the plurality of users. For example, in a representative embodiment of the present invention, the system may determine that member "A" of the social e-commerce network requested to "follow" member "B," or that member "C" indicated that they like a product review submitted by member "D." In a representative embodiment of the present invention, the analysis may identify occurrence of actions that represent influence of one member of a social e-commerce network over the actions of one or more other members of the social e-commerce network. Such influence may result in purchase decisions by the other members of the social e-commerce network.

Next, at block 506, the method of FIG. 5 may direct the system to generate, for the second user, a level of influence of the second user upon the plurality of users, based upon the analysis. In a representative embodiment of the present invention, the level of influence may be a numerical value that is computed using values representing the actions of the users, as described in further detail, above. For example, a level of influence may represent the effect that the submission of a review of a product by one member of a social e-commerce network has upon the actions of a number of other members such as, by way of example and not limitation, submitting a comment on the product review or the submission of the reviewer, expressing their approval of the product or the review (i.e., a member indicating that they "like" the product or the review), or expressing an interest in having the reviewed product (i.e., a member indicating that they "want" the reviewed product). In addition, a representative embodiment of the present invention may take the passage of time into account, by including one or more "decay factors" that adjust the outcome or result of the computation for the lessening influence of past member actions over time. In various representative embodiments of the present invention, the level of influence of one or more contributors whose submission(s) is/are to be displayed may be computed when the level of influence is needed, such as at the time that it is to be represented on, for example, a web page, or the level of influence may be computed on an ongoing basis, as information about the actions of the members of the social e-commerce network is received.

Next, a block 508, the system performing the method of FIG. 5 may represent the level of influence of the second user (e.g., one member of social e-commerce network) as a visible indicator in association with a media submission by the second user, for viewing as part of a web page. For example, in accordance with one representative embodiment of the present invention, a first member of a social e-commerce network may attempt to access a web page (e.g., such as that shown in FIG. 4) that includes, by way of example and not limitation, a submission by a second member of the social e-commerce network such as, for example, a review of a product or service (e.g., product review 436 of FIG. 4), or comments about a product or about yet some other member's review. When producing the data representing the web page (e.g., HTML), a representative embodiment of the present invention may encode the data representing the web page so that the submission is displayed to the viewer in logical association with or in physical proximity to an indication of the level of influence (e.g., the influence indicator 430 of FIG. 4) of the individual (i.e., the second member) that created the submission. The indication may be, by way of example and not limitation, a numeric value (e.g., as is the case of the influence indicator 430 of FIG. 4), or may be one of several related images, graphics, or icons used to represent various levels of influence, or some other means of conveying the various levels of influence that a contributor of a submission may have upon the actions of other members of the social e-commerce network. Logical association of the indicator with the submission may include, by way of example and not limitation, positioning the submission and the influence indicator within a graphical boundary represented as a common background color, or within a line acting as a boundary within which the submission and influence indicator are located.

Next, at block 510, the method of FIG. 5 may direct the system to send the web page representing the media submission of the second user and the associated indicator representing the level of influence of the second user upon the plurality of users, via the communication network, for display to one or more of the plurality of users. For example, once the digital information representing the web page containing the submission and the influence indicator has been created, the digital representation may be sent to those users that access the web page. In a representative embodiment of the present invention, the digital representation of the web page containing the submission and the influence indicator may be produced at the time of user access to the web page, or may be produced in advance, and may simply be retrieved from storage and sent to the user device to be rendered for viewing by the user.

Figure 6:
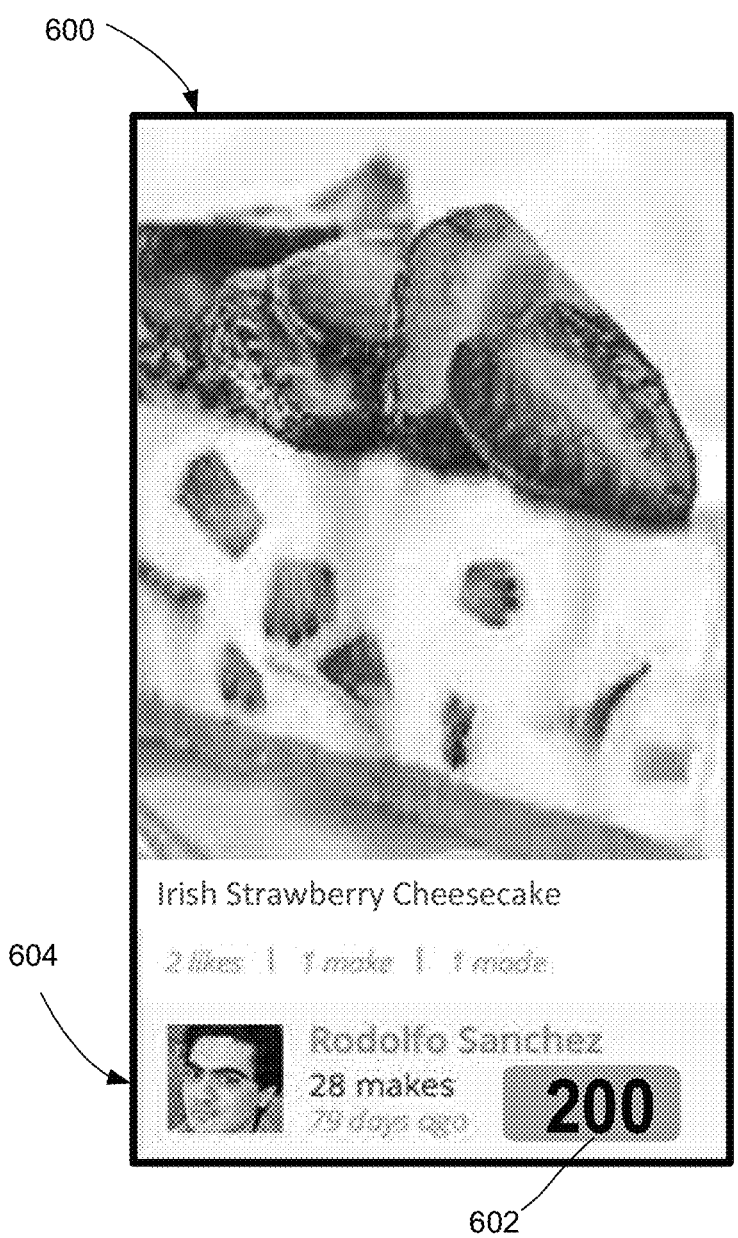
FIG. 6. is an illustration of an exemplary "make" quick-view showing the application of a level of influence indicator included in contributor information section for a "step-by-step project," in accordance with a representative embodiment of the present invention.

FIG. 6. is an illustration of an exemplary "make" quickview 600 showing the application of a level of influence indicator 602 included in contributor information section 604 for a "step-by-step project," in accordance with a representative embodiment of the present invention. The phrase "step-by-step project" and the term "make" may be used herein interchangeably to refer to a project or recipe for, by way of example and not limitation, making or repairing something such as, for example, a food item, a piece of furniture, or replacing a light switch.

As shown in FIG. 6, the "make" quickview 600 includes an image 606 of the end-result of the "step-by-step project," and a caption 608 identifying the image 606 as a slice of "Irish Strawberry Cheesecake." The "make" quickview 600 also includes a contributor or submitter section 604, that identifies the contributor as "Rodolpho Sanchez." The contributor or submitter section 604 shows that "Rodolpho" has submitted 28 "makes," and has been assigned a level of influence expressed as a numerical value of "200." As discussed above, in a representative embodiment of the present invention, a level of influence or "ScoreIN" score or value may be based upon the influence of one member of a communication network such as, for example, a social e-commerce network, upon the actions of other members of such a communication network. Such actions may include, by way of example and not limitation, a member requesting to "Follow" or be kept informed of the activities or submissions of another member (e.g., "Rodolpho"); sharing a submission of another member (e.g., the cheesecake recipe of "Rodolpho" with other members); a member submitting a review of an ingredient, tool, utensil, or material used in a: step-by-step project" (i.e., "make"); or submitting a review of a project result (e.g., the "Irish Strawberry Cheesecake" made according to the submitted recipe of "Rodolpho"). Such actions may also include, for example, a member submitting a comment on a "make" submitted by another member; a member creating a "catalog" that includes, for example, products, services, or a "make"; and a member selecting an icon indicating that they "Like," by way of example and not limitation, a particular product, service, comment, "make," review, recipe, or other person, place, or thing submitted by a member, to name only a few examples.

Figure 7:
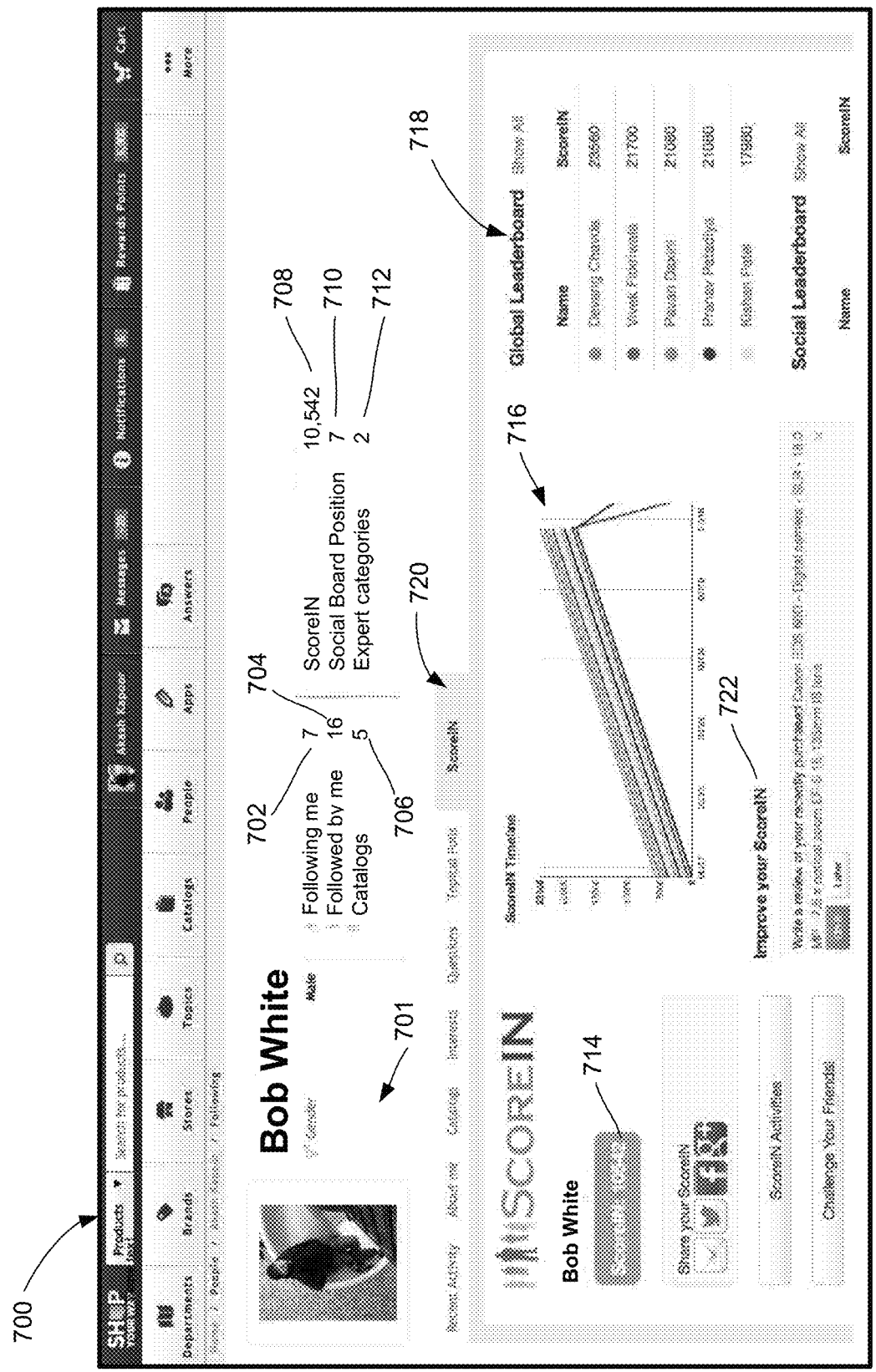
FIG. 7 is an illustration of an exemplary web page showing the status of a member of a social e-commerce network, in accordance with a representative embodiment of the present invention.

FIG. 7 is an illustration of an exemplary web page 700 showing the status of a member of a social e-commerce network, in accordance with a representative embodiment of the present invention. The web page 700 includes member information 701 for "Bob White," showing a thumbnail picture that may be provided by the member, the name of the member "Bob White," and an indication of gender ("Male"). The web page 700 also includes an indication of the number 702 of members (7) of the social e-commerce network that have requested to follow "Bob," the number of members 704 that "Bob White" is currently following (16), and the number of catalogs 706 that "Bob" currently has (5). In addition, the web page 700 includes an indication of the level of influence 708 (10,542) currently assigned to "Bob" (which, as noted above, may also be referred to herein as a "ScoreIN" value or score). The web page 700 includes a social board position 710 indicating how "Bob" ranks among members (7), and a number of categories 712 in which "Bob" is considered to be an "expert" (2). The web page 700 also provides a "ScoreIN" tab 720 to access information about "Bob's" current level of influence 714, a "Global Leaderboard" 718 listing the top ranked members in decreasing order of level of influence, and a graph 716 showing level of influence trend lines for those members listed on the "Global Leaderboard" 718. The example web page 700 of FIG. 7 also shows a section 722 that provides suggestions to members on how to improve their level of influence.

A representative embodiment of the present invention may use machine learning algorithms to determine the relative ranks of interactions. A supervised learning algorithm may be used to adjust the relative weights of the interactions to build a more complex scoring algorithm with sufficient training data. Some representative embodiments of the present invention may provide a segment score that will identify which member/user is influential in a particular segment. This may be accomplished by parsing descriptions provided from an API call on each element.

A representative embodiment of the present invention may tie influence and similarity scores. For example, a recommendation system in accordance with a representative embodiment of the present invention may make product recommendations to a user, "Natalie." In this example, the level of influence or "ScoreIN" value may be used to represent "influence," while "Taste" may be used to represent "similarity." Four basic cases may be considered: a first case with a high "ScoreIN" value and similar "Taste," a second case with a low "ScoreIN" value and similar "Taste," a third case with a low "ScoreIN" value, and similar "Taste," and a fourth case with a high "ScoreIN" value, and opposite "Taste." The four cases may be analyzed as follows.

In the first case, Eui is in Natalie's network, is very influential and has similar tastes to Natalie. In this case, "ScoreIN" may be used to reinforce recommendation logic with products that Eui is associated with.

In the second case, Eui is in Natalie's network, is not influential, but has similar tastes to Natalie. In this case, the "ScoreIn" and "Taste" values may be considered to have contradictory influence on the recommendation system. If another member, Paul, has somewhat similar tastes to Natalie, but is more influential than Eui, Paul's associated products may be more important. The degree of similarity between Eui & Natalie and Paul & Natalie may be used to determine which of the two scores (i.e., "ScoreIN" and "Taste") is the more dominant.

In the third case, Eui is in Natalie's network, is very influential, and has opposite tastes to Natalie. In this case, the "ScoreIN" and "Taste" values may be considered to have contradictory influence on the recommendation system. The degree of similarity between Eui & Natalie may be used to determine which of the two scores (i.e., "ScoreIN" and "Taste") is more dominant.

In the fourth case, Eui is in Natalie's network, is not influential, and has opposite tastes to Natalie. In this case, the "ScoreIN" value may be considered to reinforce the recommendation logic to not show products that Eui is associated with.

In this manner, a degree of similarity may help to reinforce a level of influence value (e.g., "ScoreIN") and suggestions made to shoppers such as Eui, Natalie, and Paul may be measured using an algorithm such as cosine similarity. This logic may be extended beyond product recommendations and may help members of a social e-commerce network with similar tastes connect with other influential members with their taste. This logic may be extended beyond the four basic cases discussed above.

In addition, a representative embodiment of the present invention may take into account transactional history of members. That is, the computation of level of influence may take into account a situation in which interactions/actions on a communication network such as, for example, a social e-commerce network show that a member/user has submitted a recommendation of a product, and that a recipient of that recommendation later purchases the recommended product.

Aspects of the present invention may be seen in a method for displaying an indicator representative of influence of one of a plurality of users of a communication network upon the actions of other users of the plurality of users. Such a method may comprise receiving information representative of actions of the plurality of users of the communication network, and analyzing the received information to identify, for each first user of the plurality of users, occurrence of one or more specific actions by the first user that relate to a second user of the plurality of users. A method in accordance with a representative embodiment of the present invention may also comprise generating, for the second user, a level of influence of the second user upon the plurality of users, based upon the analysis, and representing the level of influence of the second user as a visible indicator in association with a media submission by the second user, for viewing as part of a web page. Such a method may further comprise sending the web page representing the media submission of the second user and the associated indicator representing the level of influence of the second user upon the plurality of users, via the communication network, for display to one or more of the plurality of users.

In some representative embodiments of the present invention, the communication network may comprise a social network that enables the plurality of users to communicate information about one or both of products and services with one another, and to one or both of shop for and purchase one or both of products and services. The plurality of users may be members of a loyalty program of a retail merchant operating or sponsoring the communication network. The one or more specific actions may comprise the first user submitting a comment about a media submission published via the communication network by the second user, and the one or more specific actions may comprise the first user requesting to be informed of online actions of the second user. The one or more specific actions may comprise the first user performing an online action representative of approval of an online submission of the second user, and the one or more specific actions may comprise the first user purchasing one or both of a product and a service after the media submission of the second user is sent to the first user, and wherein the media submission of the second user sent to the first user comprises a review of the one or both of a product and a service. In some representative embodiments of the present invention, the one or more specific actions may comprise the first user requesting to be informed of online actions of the second user, and the one or more specific actions may comprise the first user requesting to be informed of changes to an online catalog of products or services created by the second user. In various representative embodiments of the present invention, the indicator representing the level of influence of the second user may comprise a numeric value, the media submission may comprise a review of a product or service, and the media submission may comprise a recommendation of a product or service. The web page may comprise user interface elements for online purchase of a product or service.

Additional aspects of the present invention may be found in a system for displaying an indicator representative of influence of one of a plurality of users of a communication network upon the actions of other users of the plurality of users. Such a system may comprise at least one processor for communicatively coupling to user devices of the plurality of users, wherein the at least one processor is operable to perform the method described above.

Yet other aspects of the present invention may be observed in a non-transitory computer-readable medium having a plurality of code sections, where each code section comprises a plurality of instructions executable by one or more processors to perform actions of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for displaying an indicator representative of influence of one of a plurality of users of a communication network upon the actions of other users of the plurality of users, the method comprising:
    receiving, via selections of graphical elements of graphical user interfaces, information representative of actions of the plurality of users of the communication network that includes an e-commerce platform;
    analyzing the received information to identify, for each first user of the plurality of users, occurrence of one or more specific actions by the first user that relate to a second user of the plurality of users;
    generating, for the first user, a graphical user interface that displays a level of influence of the first user, wherein the graphical user interface suggests activities for the first user to perform to increase the level of influence of the first user, and wherein the graphical user interface presents categories about which the first user is considered an expert;
    generating, for the second user, a level of influence of the second user upon the plurality of users, based upon the analysis and the level of influence of the first user;
    reducing the level of influence of the first user or the second user based on a time duration of inactivity of the first user or the second user with respect to the communication network or the e-commerce platform;
    reducing the level of influence of the first user or the second user based on a type of activity of the first user or the second user with respect to the communication network or the e-commerce platform;
    in response to a selection of one or more graphical elements of the graphical user interface, providing the first user or the second user with an opportunity, via a selection of one or more graphical elements of the graphical user interface, for increasing the level of influence of the first user or the second user;
    representing, on the graphical user interface, the level of influence of the second user as a visible indicator in association with a media submission by the second user, for viewing as part of a web page;
    sending the web page representing the media submission of the second user and the associated indicator representing the level of influence of the second user upon the plurality of users, via the communication network, for display on one or more of the graphical user interfaces of one or more of the plurality of users; and
    identifying one or more of the plurality of users for the communication network with a highest level of influence on the first user to drive engagement of the first user with the e-commerce platform.

2. The method according to claim 1, wherein the communication network is a social network that enables the plurality of users to communicate information about one or both of products and services with one another, and to one or both of shop for and purchase one or both of products and services, and wherein the plurality of users are members of a loyalty program of a retail merchant operating or sponsoring the communication network.

3. The method according to claim 1, accessing information, via an application program interface by an entity external to the e-commerce platform, about each user to identify the one or more of the plurality of users for the communication network with the highest level of influence.

4. The method according to claim 1, wherein the plurality of users are members of a loyalty program of a retail merchant operating or sponsoring the communication network.

5. The method according to claim 1, wherein the one or more specific actions comprise the first user submitting a comment about a media submission published via the communication network by the second user.

6. The method according to claim 1, wherein the one or more specific actions comprise the first user requesting to be informed of online actions of the second user.

7. The method according to claim 1, wherein the one or more specific actions comprise the first user performing an online action representative of approval of an online submission of the second user.

8. The method according to claim 1,
wherein the one or more specific actions comprise the first user purchasing one or both of a product and a service after the media submission of the second user is sent to the first user, and wherein the media submission of the second user sent to the first user comprises a review of the one or both of a product and a service, or
wherein the one or more specific actions comprise the first user requesting to be informed of changes to an online catalog of products or services created by the second user.

9. The method according to claim 1, wherein the level of influence of the second user is based on a number of users following the second user and the level of influence of the followers.

10. The method according to claim 1, wherein the graphical user interface, displaying the level of influence of the first user, can display a graph showing an influence trend.

11. The method according to claim 1, wherein the indicator representing the level of influence of the second user comprises a numeric value.

12. The method according to claim 1, wherein the media submission comprises a review of a product or service.

13. The method according to claim 1, wherein the media submission comprises a recommendation of a product or service, and wherein the web page comprises user interface elements for online purchase of a product or service.

14. The method according to claim 1, wherein the media recommendation includes comments by the second user, and wherein the associated indicator includes a value that indicates increasing influence when others of the plurality of users indicate that the comments are helpful.

15. A system for displaying an indicator representative of influence of one of a plurality of users of a communication network upon the actions of other users of the plurality of users, the system comprising:
at least one processor for communicatively coupling to user devices of the plurality of users, wherein the at least one processor is operable to, at least:
receive, via selections of graphical elements of graphical user interfaces, information representative of actions of the plurality of users of the communication network that includes an e-commerce platform;
analyze the received information to identify, for each first user of the plurality of users, occurrence of one or more specific actions by the first user that relate to a second user of the plurality of users;
generate, for the first user, a graphical user interface that displays a level of influence of the first user, wherein the graphical user interface suggests activities for the first user to perform to increase the level of influence of the first user, and wherein the graphical user interface presents categories about which the first user is considered an expert;
generate, for the second user, a level of influence of the second user upon the plurality of users, based upon the analysis and the level of influence of the first user;
reduce the level of influence of the first user or the second user based on a time duration of inactivity of the first user or the second user with respect to the communication network or the e-commerce platform;
reduce the level of influence of the first user or the second user based on a type of activity of the first user or the second user with respect to the communication network or the e-commerce platform;
in response to a selection of one or more graphical elements of the graphical user interface, provide the first user or the second user with an opportunity, via a selection of one or more graphical elements of the graphical user interface, for increasing the level of influence of the first user or the second user;
represent, on the graphical user interface, the level of influence of the second user as a visible indicator in association with a media submission by the second user, for viewing as part of a web page;
send the web page representing the media submission of the second user and the associated indicator representing the level of influence of the second user upon the plurality of users, via the communication network, for display on one or more of the graphical user interfaces of one or more of the plurality of users; and
identifying one or more of the plurality of users for the communication network with a highest level of influence on the first user to drive engagement of the first user with the e-commerce platform.

16. The system according to claim 15, wherein the communication network is a social network that enables the plurality of users to communicate information about one or both of products and services with one another, and to one or both of shop for and purchase one or both of products and services.

17. The system according to claim 16, wherein the plurality of users are members of a loyalty program of a retail merchant operating or sponsoring the communication network.

18. The system according to claim 15, wherein the plurality of users are members of a loyalty program of a retail merchant operating or sponsoring the communication network.

19. The system according to claim 15, wherein the one or more specific actions comprise the first user submitting a comment about a media submission published via the communication network by the second user.

20. The system according to claim 15, wherein the one or more specific actions comprise the first user requesting to be informed of online actions of the second user.

21. The system according to claim 15, wherein the one or more specific actions comprise the first user performing an online action representative of approval of an online submission of the second user.

22. The system according to claim 15, wherein the one or more specific actions comprise the first user purchasing one or both of a product and a service after the media submission of the second user is sent to the first user, and wherein the media submission of the second user sent to the first user comprises a review of the one or both of a product and a service.

23. The system according to claim 15, wherein the level of influence of the second user is based on a number of users following the second user and the level of influence of the followers.

24. The system according to claim 15, wherein the one or more specific actions comprise the first user requesting to be informed of changes to an online catalog of products or services created by the second user.

25. The system according to claim 15, wherein the indicator representing the level of influence of the second user comprises a numeric value.

26. The system according to claim 15, wherein the media submission comprises a review of a product or service.

27. The system according to claim 15, wherein the media submission comprises a recommendation of a product or service, and the web page comprises user interface elements for online purchase of a product or service.

28. The system according to claim 15, comprising:
reducing a respective contribution to the level of influence of the first user or the second user when a type of action performed, via a selection of one or more graphical elements of the graphical user interface, with respect to the communication network or the e-commerce platform is repeated by the first user or the second user.

29. A non-transitory computer-readable medium having a plurality of code sections, each code section comprising a plurality of instructions executable by one or more processors to perform actions for displaying an indicator representative of influence of one of a plurality of users of a communication network upon the actions of other users of the plurality of users, the actions of the one or more processors comprising:
receiving, via selections of graphical elements of graphical user interfaces, information representative of actions of the plurality of users of the communication network that includes an e-commerce platform;
analyzing the received information to identify, for each first user of the plurality of users, occurrence of one or more specific actions by the first user that relate to a second user of the plurality of users;
generating, for the first user, a graphical user interface that displays a level of influence of the first user, wherein the graphical user interface suggests activities for the first user to perform to increase the level of influence of the first user, and wherein the graphical user interface presents categories about which the first user is considered an expert;
generating, for the second user, a level of influence of the second user upon the plurality of users, based upon the analysis and the level of influence of the first user;
reducing the level of influence of the first user or the second user based on a time duration of inactivity of the first user or the second user with respect to the communication network or the e-commerce platform;
reducing the level of influence of the first user or the second user based on a type of activity of the first user or the second user with respect to the communication network or the e-commerce platform;
in response to a selection of one or more graphical elements of the graphical user interface, providing the first user or the second user with an opportunity, via a selection of one or more graphical elements of the graphical user interface, for increasing the level of influence of the first user or the second user;
representing, on the graphical user interface, the level of influence of the second user as a visible indicator in association with a media submission by the second user, for viewing as part of a web page;
sending the web page representing the media submission of the second user and the associated indicator representing the level of influence of the second user upon the plurality of users, via the communication network, for display on one or more of the graphical user interfaces of one or more of the plurality of users; and
identifying one or more of the plurality of users for the communication network with a highest level of influence on the first user to drive engagement of the first user with the e-commerce platform.

30. The non-transitory computer-readable medium according to claim 29, wherein the communication network is a social network that enables the plurality of users to communicate information about one or both of products and services with one another, and to one or both of shop for and purchase one or both of products and services, and wherein the plurality of users are members of a loyalty program of a retail merchant operating or sponsoring the communication network.

31. The non-transitory computer-readable medium according to claim 29, wherein reducing the level of influence of the first user or the second user based on the time duration of inactivity comprises exponentially reducing the level of influence of the first user or the second user based on time duration of inactivity and a half-life parameter.

32. The non-transitory computer-readable medium according to claim 29, wherein the plurality of users are members of a loyalty program of a retail merchant operating or sponsoring the communication network.

33. The non-transitory computer-readable medium according to claim 29, wherein the one or more specific actions comprise the first user submitting a comment about a media submission published via the communication network by the second user.

34. The non-transitory computer-readable medium according to claim 29, wherein the one or more specific actions comprise the first user requesting to be informed of online actions of the second user.

35. The non-transitory computer-readable medium according to claim 29, wherein the one or more specific actions comprise the first user performing an online action representative of approval of an online submission of the second user.

36. The non-transitory computer-readable medium according to claim 29, wherein the one or more specific actions comprise the first user purchasing one or both of a product and a service after the media submission of the second user is sent to the first user, and wherein the media submission of the second user sent to the first user comprises a review of the one or both of a product and a service.

37. The non-transitory computer-readable medium according to claim 29, wherein the level of influence of the second user is based on a number of users following the second user and the level of influence of the followers.

38. The non-transitory computer-readable medium according to claim 29, wherein the one or more specific actions comprise the first user requesting to be informed of changes to an online catalog of products or services created by the second user.

39. The non-transitory computer-readable medium according to claim 29, wherein the indicator representing the level of influence of the second user comprises a numeric value.

40. The non-transitory computer-readable medium according to claim 29, wherein the media submission comprises a review of a product or service.

41. The non-transitory computer-readable medium according to claim 29, wherein the media submission comprises a recommendation of a product or service, and wherein the web page comprises user interface elements for online purchase of a product or service.

42. The non-transitory computer-readable medium according to claim 29, wherein the associated indicator includes a value that includes a first measure of the influence of the second user on other users and a second measure of engagement of the second user with the communication network, wherein the first measure and the second measure are weighted differently.

* * * * *